US011982927B2

United States Patent
Suwa et al.

(10) Patent No.: US 11,982,927 B2
(45) Date of Patent: May 14, 2024

(54) LIGHT IRRADIATION DEVICE HAVING TWO WEDGE PRISMS AND AN ABERRATION CORRECTION SURFACE

(71) Applicant: Mitsubishi Electric Corporation, Tokyo (JP)

(72) Inventors: Masashige Suwa, Tokyo (JP); Ritsuya Oshima, Tokyo (JP); Muneharu Kuwata, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 778 days.

(21) Appl. No.: 17/054,178

(22) PCT Filed: Jun. 4, 2018

(86) PCT No.: PCT/JP2018/021373
§ 371 (c)(1),
(2) Date: Nov. 10, 2020

(87) PCT Pub. No.: WO2019/234795
PCT Pub. Date: Dec. 12, 2019

(65) Prior Publication Data
US 2021/0190295 A1 Jun. 24, 2021

(51) Int. Cl.
*G03B 21/13* (2006.01)
*G02B 26/08* (2006.01)
(Continued)

(52) U.S. Cl.
CPC ......... *G03B 21/13* (2013.01); *G02B 26/0891* (2013.01); *G02B 27/0025* (2013.01);
(Continued)

(58) Field of Classification Search
CPC ............... G03B 21/13; G03B 21/142; G03B 2205/003; G02B 26/0891; G02B 27/0025;
(Continued)

(56) References Cited

U.S. PATENT DOCUMENTS

| 6,014,205 A | 1/2000 | Kanazawa et al. |
| 6,344,937 B1 | 2/2002 | Sparrold et al. |

(Continued)

FOREIGN PATENT DOCUMENTS

| EP | 3 417 985 A1 | 12/2018 |
| JP | 6-34910 A | 2/1994 |

(Continued)

OTHER PUBLICATIONS

Office Action dated Dec. 3, 2021, in corresponding Chinese patent Application No. 201880093929. X, 18 pages.

(Continued)

*Primary Examiner* — Magda Cruz
(74) *Attorney, Agent, or Firm* — XSENSUS LLP

(57) ABSTRACT

A light irradiation device includes a light source, a projection optical system, wedge prisms, and an aberration correction surface. The projection optical system projects an image formed based on light emitted from the light source. The aberration correction surface corrects an aberration occurring when the image is projected by the projection optical system. The wedge prism deflects the light emitted from the projection optical system. The wedge prism deflects the light deflected by the wedge prism. The wedge prisms are held so that a deflection direction of light emitted from the wedge prism is changed by rotation of at least one of the wedge prisms. The aberration correction surface is on the wedge prism side with respect to an emission surface of the projection optical system, and is located on the projec- (Continued)

tion optical system side, with respect to the wedge prism, including an incidence surface of the wedge prism.

14 Claims, 6 Drawing Sheets

(51) Int. Cl.
    *G02B 27/00*     (2006.01)
    *G02B 27/18*     (2006.01)
    *G03B 21/14*     (2006.01)

(52) U.S. Cl.
    CPC ......... *G02B 27/0068* (2013.01); *G02B 27/18* (2013.01); *G03B 21/142* (2013.01); *G03B 2205/003* (2013.01)

(58) Field of Classification Search
    CPC ............ G02B 27/0068; G02B 27/18; B60Q 2400/50; F21S 41/143; F21S 41/635
    See application file for complete search history.

(56) References Cited

U.S. PATENT DOCUMENTS

| | | | | |
|---|---|---|---|---|
| 2009/0079824 A1* | 3/2009 | Winsor | ............ | H04N 23/58 |
| | | | | 348/143 |
| 2010/0309443 A1* | 12/2010 | Cheng | ............ | G02B 26/0883 |
| | | | | 353/122 |
| 2015/0267888 A1* | 9/2015 | Suwa | ............ | F21S 41/635 |
| | | | | 362/512 |
| 2017/0160541 A1* | 6/2017 | Carothers | ............ | G01S 7/4813 |
| 2018/0095270 A1* | 4/2018 | Carothers | ............ | G02B 26/108 |
| 2019/0047083 A1* | 2/2019 | Fujita | ............ | G02B 26/08 |

FOREIGN PATENT DOCUMENTS

| | | | | |
|---|---|---|---|---|
| JP | 9-197310 A | | 7/1997 | |
| JP | 11-38339 A | | 2/1999 | |
| JP | 2002-174785 A | | 6/2002 | |
| JP | 2002174785 A | * | 6/2002 | ............ G02B 26/10 |
| JP | 2004-283873 A | | 10/2004 | |
| JP | 2013-222152 A | | 10/2013 | |
| JP | 2017-144445 A | | 8/2017 | |

OTHER PUBLICATIONS

Chinese Office Action dated Jul. 5, 2022, in corresponding Chinese patent Application No. 201880093929. X.
International Search Report and Written Opinion dated Aug. 21, 2018 for PCT/JP2018/021373 filed on Jun. 4, 2018, 9 pages including English Translation of the International Search Report.
Japanese Office Action dated Aug. 10, 2021 in Japanese Application No. 2020-523859.
German Office Action dated Jul. 31, 2023 in corresponding German Patent Application No. 112018007683.0 (with 1 English translation), 8 pages.

* cited by examiner

LIGHT IRRADIATION DEVICE HAVING TWO WEDGE PRISMS AND AN ABERRATION CORRECTION SURFACE

CROSS-REFERENCE TO RELATED APPLICATION

The present application is based on PCT filing PCT/JP2018/021373, filed Jun. 4, 2018, the entire contents of which are incorporated herein by reference.

TECHNICAL FIELD

The present invention relates to a light irradiation device.

BACKGROUND ART

For example, Patent Reference 1 discloses a multibeam scanning device that uses a refraction optical system including a combination of two wedge prisms whose wedge directions are opposite to each other. One of the prisms is rotated relative to the other so as to adjust the direction of a light beam.

PRIOR ART REFERENCE

Patent Reference

Patent Reference 1: Japanese Patent Application Publication No. 2002-174785 (paragraphs 0011, 0045, and FIG. 3)

SUMMARY OF THE INVENTION

Problem to be Solved by the Invention

However, each wedge prism of the multibeam scanning device described in Patent Reference 1 has a combination of two planes. Thus, light passing through the wedge prisms has aberration. In particular, the influence of the aberration is noticeable when a light source such as a surface-emitting LED is used. Accordingly, large aberration occurs. As a result, a contour of irradiation light is blurred on a surface irradiated with the light.

Means of Solving the Problem

A light irradiation device according to the present invention includes a light source to emit light, a projection optical system to project an image formed based on the light emitted from the light source, an aberration correction surface to correct an aberration occurring when the image is projected by the projection optical system, a first wedge prism to receive and deflect the light emitted from the projection optical system, and a second wedge prism to receive and deflect the light deflected by the first wedge prism. The first wedge prism and the second wedge prism are held so that a deflection direction of light emitted from the second wedge prism is changed by rotation of at least one of the first wedge prism and the second wedge prism. The aberration correction surface is located on the first wedge prism side with respect to an emission surface of the projection optical system, and is located on the projection optical system side, with respect to the first wedge prism, including an incident surface of the first wedge prism.

Effects of the Invention

With the light irradiation device according to the present invention, it is possible to reduce aberration that occurs when light is deflected by a pair of wedge prisms.

MODE FOR CARRYING OUT THE INVENTION

Figure 1:
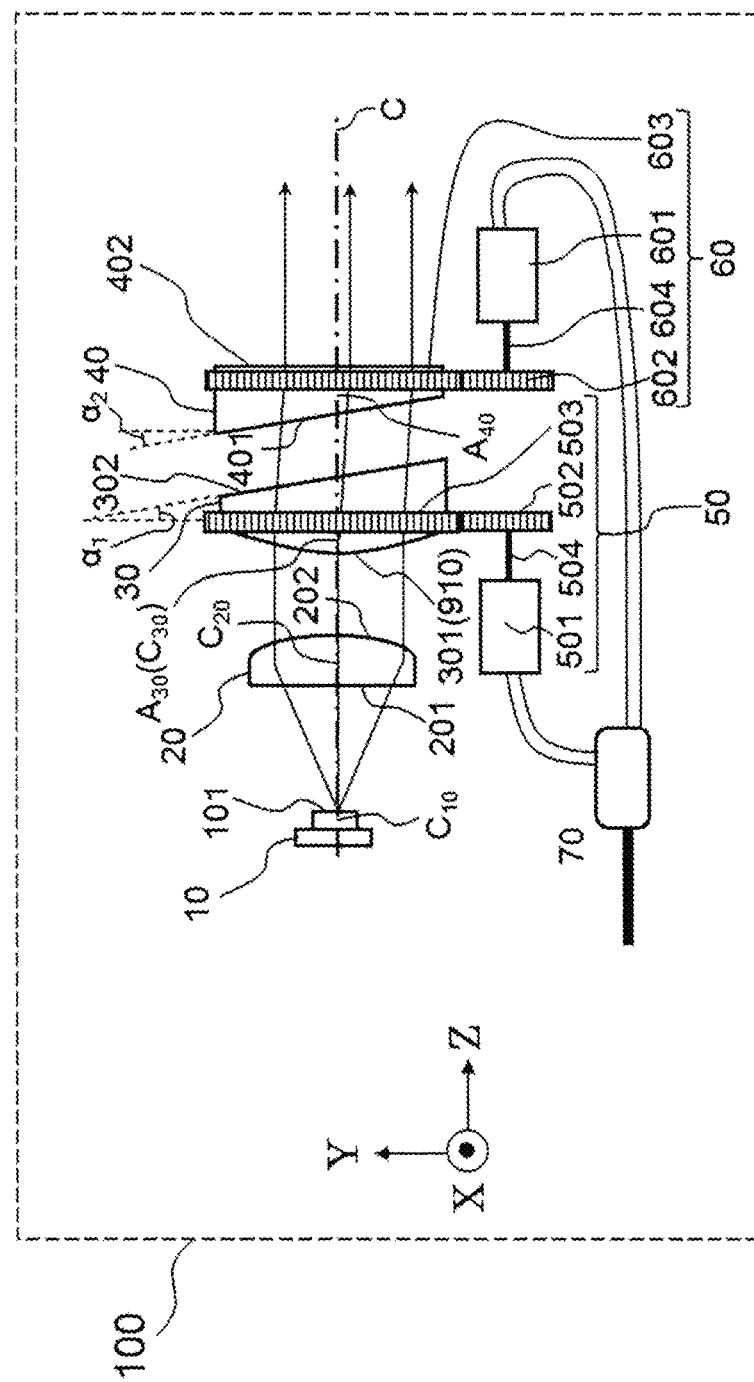
FIG. 1 is a view schematically illustrating a configuration of a light irradiation device 100 according to a first embodiment of the present invention.

From the viewpoint of reducing environmental load, such as reducing emission of carbon dioxide ($CO_2$) and consumption of fuel, it is desired to save energy of light irradiation devices. Accordingly, downsizing, weight reduction, and power saving of the light irradiation devices are required. In view of this, as a light source for the light irradiation device, it is desired to employ a semiconductor light source exhibiting higher light-emission efficiency than a conventional halogen bulb (lamp light source). Examples of the "semiconductor light source" include a light-emitting diode (LED), a laser diode (LD) and the like.

A light source such as a light source using an organic electroluminescence (organic EL), a light source using a phosphor, or the like is referred to as a solid light source. As to the light source using a phosphor, the phosphor coated on, for example, a base material is irradiated with excitation light so that the phosphor emits light. The semiconductor light source is one of the solid light source.

A wedge prism is a prism having an emission surface which is tilted with respect to an incident surface. That is, the wedge prism includes a tilted optical surface. One surface of the wedge prism is tilted by a small angle with respect to the other surface. A tilt angle of one surface with respect to the other surface is referred to as a wedge angle or an apex angle. Light incident on the wedge prism is refracted at an angle in accordance with the apex angle and is emitted. Light incident on the wedge prism is refracted in a direction toward a side in which the prism has a larger thickness. An angle of light emitted from the wedge prism with respect to light incident on the wedge prism is referred to as a deflection angle.

In the following description, the apex angle will be referred to as a wedge angle α. Although two refraction surfaces of the wedge prism are generally flat surfaces, a "wedge prism" described below includes a prism having at least one refraction surface which is a curved surface.

In the following embodiment, one surface of the wedge prism is a surface perpendicular to a rotation axis. Alternatively, two surfaces of the wedge prism may be tilted with respect to the rotation axis. That is, an incident surface and an emission surface of the wedge prism may be tilted with respect to the rotation axis.

In a device that deflects light by using two wedge prisms such as the multibeam scanning device of Patent Reference 1, light emitted from the wedge prisms is irradiated onto a circular area on an irradiation surface.

The two wedge prisms are rotated about the rotation axis of the wedge prisms so that the deflection direction of light emitted from the wedge prisms is changed. For example, when the two wedge prisms are rotated in opposite directions by the same angle, light emitted from the wedge prisms moves along a straight line on the irradiation surface. That is, light emitted from the wedge prisms moves linearly in a direction perpendicular to the rotation axis of the wedge prisms. Light emitted from the wedge prisms moves linearly on the irradiation surface in a direction perpendicular to the rotation axis of the wedge prisms.

A device that deflects light by using two wedge prisms is employed in, for example, an apparatus that forms an image or displays information by scanning with a light beam having a small beam diameter such as laser light. However, a light irradiation device 100 is employed in, for example, an illumination device or the like that changes light distribution by scanning with a light beam having a larger beam diameter such as a light beam of an LED.

The light irradiation device 100 is employed in an apparatus that displays a projected image while moving the projected image on an irradiation surface. For example, an image display device is disposed on a light path of the light irradiation device 100. The image display device is a diaphragm plate having a shape of a symbol or the like, a liquid crystal panel, or the like. Accordingly, the light irradiation device 100 is capable of moving a projected image of the symbol, the image or the like on the irradiation surface. In this manner, the light irradiation device 100 is capable of projecting image information on a road surface, a passage or the like to attract attention, to guide a passenger or for other purposes.

The light irradiation device 100 is also applicable to, for example, a downlight, a spotlight, a searchlight, or a vehicle lighting device.

The downlight is a small lighting appliance that is buried in and attached to a ceiling in a building. The light irradiation device 100 is capable of moving an irradiation area of the downlight. Further, the downlight is capable of projecting a projected image.

The spotlight is one of lighting appliances devised to throw strong light intensively on a specific place. The spotlight is a lighting appliance used mainly in a theater or the like for attracting attention of an audience, and is configured to intensively illuminate one spot. The spotlight is used while moving an irradiated position when an irradiation target moves.

The searchlight is an illumination device configured to illuminate a distant place at nighttime. The searchlight is generally mounted to an altazimuth mount swingable vertically and laterally. The light irradiation device 100 is capable of moving an irradiation area without using the altazimuth mount.

The light irradiation device 100 serves as a vehicle lighting device and can be used as a high beam headlight which is an illumination device of a vehicle such as an automobile or the like. The high beam headlight is a headlight that is used during traveling. An illumination distance of the high beam headlight is, for example, 100 m. For example, in order to illuminate a pedestrian in front of the vehicle during traveling, the light irradiation device 100 moves an irradiation position in accordance with the pedestrian.

The light irradiation device 100 serves as a vehicle lighting device and can be used as a low beam headlight of an automobile or the like. The low beam headlight is a headlight that is used when the vehicle passes by an oncoming vehicle. An illumination distance of the low beam headlight is, for example, 30 m. For example, the light irradiation device 100 moves an irradiation position at high speed to thereby achieve light distribution required for the low beam headlight.

The light irradiation device 100 serves as a vehicle lighting device and can be used as a light distribution variable headlight system of an automobile or the like. The light distribution variable headlight system is, for example, an adaptive driving beam (ADB). In order not to dazzle a forward vehicle by a high beam during travelling, the ADB turns off only irradiation on an area that dazzles the front vehicle. The ADB irradiates the other area with the high beam to secure visibility and enhance safety.

For such illumination devices, the light irradiation device 100 can reduce blurring of the contour of irradiated light.

In the following embodiment, XYZ rectangular coordinates are shown in the figures in order to facilitate description.

In the following description, the frontward direction of the light irradiation device 100 will be referred to as a +Z-axis direction, and the rearward direction of the light irradiation device 100 will be referred to as a −Z-axis direction. The front direction of the light irradiation device 100 is a direction in which illumination light is emitted. In the following embodiment, for example, light emitted from a light source 10 is emitted in the +Z-axis direction. The upward direction of the light irradiation device 100 will be referred to as a +Y-axis direction, and the downward direction of the light irradiation device 100 will be referred to as a −Y-axis direction. For example, in the case of a vehicle lighting device, the upward direction of the vehicle is the +Y-axis direction. The downward direction of the vehicle is the −Y-axis direction. As one faces the frontward direction with respect to the light irradiation device 100 (+Z-axis direction), the rightward direction of the light irradiation device 100 will be referred to as a +X-axis direction, and the leftward direction of the light irradiation device 100 will be referred to as a −X-axis direction. The surface side of the figure is the +X-axis direction, and the back side of the figure is the −X-axis direction.

FIRST EMBODIMENT

FIG. 1 is a view illustrating a configuration of a light irradiation device 100 according to a first embodiment.

[Configuration of Light Irradiation Device 100]

The light irradiation device 100 includes a light source 10, a projection optical system 20, a wedge prism 30, and a wedge prism 40. The light irradiation device 100 can include rotation mechanisms 50 and 60 and a control circuit 70. An optical axis C is an optical axis of the light irradiation device 100. The direction of the optical axis described below can be changed by using a mirror or the like. The positional relationships with respect to the optical axis direction are illustrated while the optical axis is regarded as a straight line.

(Light Source 10)

The light source 10 emits light. The light source 10 emits illumination light. The light source 10 emits light from a light-emitting surface 101. The light source 10 includes, for example, the light-emitting surface 101 which is planar. That is, the light source 10 is a planar light source. The light source 10 is a light source of planar light emission. The "planar light source" is, for example, a light source that cannot be treated as a point-like light source in a design stage.

An optical axis $C_{10}$ is an optical axis of the light source 10. The optical axis $C_{10}$ is, for example, an axis passing through the center of the light-emitting surface 101 of the light source 10 and perpendicular to the light-emitting surface 101. The optical axis $C_{10}$ is, for example, a main optical axis of the light source 10. The main optical axis is not a geometrical center axis of the illumination device but an optical center axis of light emitted from the light source. The main optical axis is generally in an emission direction in which the luminous intensity is maximum.

The light source 10 is, for example, an LED. The light source 10 is, for example, a solid light source. In the following description, the light source 10 will be described as an LED.

(Projection Optical System 20)

The projection optical system 20 changes a divergence angle of incident light. The projection optical system 20 makes the divergence angle of emitted light smaller than the divergence angle of incident light. The projection optical system 20 collects light emitted from the light source 10. In the case where an LED having a large divergence angle is used, the projection optical system 20 can efficiently collect light while the projection optical system 20 is small in size.

The projection optical system 20 is, for example, a lens. The projection optical system 20 is, for example, a projection lens. The projection optical system 20 projects a planar image formed based on light emitted from the light source 10. The projection optical system 20 enlarges and projects the planar image formed based on light emitted from the light source 10.

The projection optical system 20 projects, for example, an image of the light-emitting surface 101 of the light source 10. For example, the projection optical system 20 projects a light source image. For example, a focal point of the projection optical system 20 is located on the light-emitting surface 101. The projection optical system 20 converts light emitted from the light source 10 to parallel light, for example.

Converting light to parallel light includes converting light emitted from a position on the optical axis $C_{10}$ of the light-emitting surface 101 to parallel light and converting light emitted from a periphery of the light-emitting surface 101 to approximate parallel light. The light emitted from the position on the optical axis $C_{10}$ of the light-emitting surface 101 is light emitted from a point at intersection of the light-emitting surface 101 with the optical axis $C_{10}$. An optical axis $C_{20}$ is an optical axis of the projection optical system 20. In the following description, the optical axis $C_{10}$ and the optical axis $C_{20}$ will be described as the same axis.

(Wedge Prisms 30 and 40)

The wedge prism 30 and the wedge prism 20 are held so that at least one of the wedge prism 30 and the wedge prism 40 rotates about a rotation axis $A_{30}$ or $A_{40}$. The rotation axis $A_{30}$ and the rotation axis $A_{40}$ may be regarded as a first rotation axis and a second rotation axis, respectively. In the following description, however, the wedge prism 30 and the wedge prism 40 are held so that both of the wedge prism 30 and the wedge prism 40 rotate. The wedge prism 30 and the wedge prism 40 deflect incident light. The wedge prism 30 and the wedge prism 40 deflect an incident light beam.

The wedge prism 30 receives light emitted from the light source 10. The wedge prism 30 receives and deflects light emitted from the light source 10. The wedge prism 30 receives light emitted from, for example, the projection optical system 20. The wedge prism 30 receives and deflects light emitted from the projection optical system 20.

The wedge prism 30 is held to rotate about the rotation axis $A_{30}$. The rotation axis $A_{30}$ is an axis about which the wedge prism 30 rotates.

The wedge prism 30 includes an incident surface 301 and an emission surface 302.

The incident surface 301 receives light emitted from the light source 10. The incident surface 301 receives light emitted from the projection optical system 20, for example. The incident surface 301 receives light emitted from an emission surface 202 of the projection optical system 20, for example.

The incident surface 301 corrects aberration occurring when an image is projected by the projection optical system 20. The incident surface 301 corrects aberration occurring on a projected image when the image is projected by the projection optical system 20. The incident surface 301 corrects aberration occurring when an image of the light-emitting surface 101 is projected by the projection optical system 20. The incident surface 301 corrects aberration of, for example, a projected light source image.

The incident surface 301 is a surface at which aberration is corrected. That is, the incident surface 301 is an aberration correction surface 910. The aberration correction surface 910 is formed at the incident surface 301 of the wedge prism 30.

The aberration correction surface 910 is, for example, a surface rotationally symmetric with respect to the rotation axis $A_{30}$ of the wedge prism 30. The aberration correction surface 910 formed at the incident surface 301 is, for example, a surface rotationally symmetric with respect to the rotation axis $A_{30}$ of the wedge prism 30. An optical axis $C_{30}$ of the aberration correction surface 910 formed at the incident surface 301 and the rotation axis $A_{30}$ are the same axis. The aberration correction surface 910 formed at the incident surface 301 is, for example, a surface rotationally symmetric with respect to the optical axis $C_{30}$ of the aberration correction surface 910.

The rotation axis $A_{30}$ of the wedge prism 30 and the optical axis $C_{20}$ of the projection optical system 20 are, for example, the same axis. The optical axis $C_{10}$, the optical axis $C_{20}$, and the rotation axis $A_{30}$ are, for example, the same axis.

At least in a case where the wedge prism 30 is held to rotate about the rotation axis $A_{30}$, the aberration correction surface 910 is a surface rotationally symmetric with respect to the rotation axis $A_{30}$ of the wedge prism 30. The incident surface 301 has a convex surface shape. The incident surface 301 is, for example, an aspherical surface. The aberration correction surface 910 has a convex surface shape. The aberration correction surface 910 is, for example, an aspherical surface.

The emission surface 302 is, for example, a surface tilted relative to a surface perpendicular to the rotation axis $A_{30}$. The emission surface 302 is tilted by a wedge angle $\alpha_1$. The wedge angle $\alpha_1$ is an angle in a case where the incident surface 301 is a surface perpendicular to the rotation axis $A_{30}$. The emission surface 302 is, for example, a flat surface.

In the following description, the apex angle will be referred to as a wedge angle $\alpha$. A wedge angle $\alpha$ of the wedge prism 30 is the wedge angle $\alpha_1$. A wedge angle $\alpha$ of the wedge prism 40 described later is a wedge angle $\alpha_2$. The wedge angle $\alpha_1$ of the wedge prism 30 is, for example, equal to the wedge angle $\alpha_2$ of the wedge prism 40 ($\alpha_1 = \alpha_2$). A material of the wedge prism 30 is, for example, the same as a material of the wedge prism 40.

The wedge prism 30 is provided with a gear 503. The gear 503 transmits rotational motion from the rotation mechanism 50 to the wedge prism 30. A driving force from the rotation mechanism 50 is transmitted to the gear 503. The gear 503 can be provided on a barrel holding the wedge prism 30 or the like. A method for transmitting the driving force from the rotation mechanism 50 to the wedge prism 30 is not limited to the gear 503. For example, the driving force may be transmitted using a belt or the like.

The wedge prism 40 receives light emitted from the wedge prism 30. The wedge prism 40 receives and deflects light deflected by the wedge prism 30.

The wedge prism 40 is held to rotate about the rotation axis $A_{40}$. The rotation axis $A_{40}$ is an axis about which the wedge prism 40 rotates. For example, the rotation axis $A_{30}$ and the rotation axis $A_{40}$ are the same axis. The optical axis $C_{10}$, the optical axis $C_{20}$, the rotation axis $A_{30}$, and the rotation axis $A_{40}$ are, for example, the same axis.

The wedge prism 40 includes an incident surface 401 and an emission surface 402.

The incident surface 401 receives light emitted from the wedge prism 30. The incident surface 401 receives light emitted from the emission surface 302 of the wedge prism 30.

The incident surface 401 is, for example, a surface tilted relative to a surface perpendicular to the rotation axis $A_{40}$. The incident surface 401 is tilted by the wedge angle $\alpha_2$. The incident surface 401 is, for example, a flat surface.

The emission surface 402 is, for example, a surface perpendicular to the rotation axis $A_{40}$. The emission surface 402 is, for example, a flat surface.

The emission surface 402 may be a surface tilted relative to a surface perpendicular to the rotation axis $A_{40}$. The incident surface 401 may be a surface perpendicular to the rotation axis $A_{40}$.

The wedge prism 40 is provided with a gear 603. The gear 603 transmits rotational motion from the rotation mechanism 60 to the wedge prism 40. A driving force from the rotation mechanism 60 is transmitted to the gear 603. The gear 603 can be provided on a barrel holding the wedge prism 40 or the like. The method for transmitting the driving force from the rotation mechanism 60 to the wedge prism 40 is not limited to the gear 603. For example, the driving force may be transferred using a belt or the like.

The rotation mechanism 60 is not necessarily needed for driving the wedge prism 40. For example, the wedge prism 40 may be rotated by transmitting a driving force of the rotation mechanism 50 to the gear 603.

Light emitted from the wedge prism 30 is refracted in accordance with the wedge angle $\alpha_1$ of the wedge prism 30. Light emitted from the wedge prism 30 enters the wedge prism 40. Light emitted from the wedge prism 40 is refracted in accordance with the wedge angle $\alpha_2$ of the wedge prism 40.

(Rotation Mechanisms 50 and 60)

The rotation mechanism 50 causes the wedge prism 30 to rotate. The rotation mechanism 50 includes a driving source 501, a gear 502, the gear 503, and a rotation shaft 504.

The driving source 501 is, for example, a motor. The driving source 501 is, for example, a stepping motor or the like. The rotation shaft 504 is a shaft for transmitting rotation of the driving source 501 to the gear 502. The rotation shaft 504 is, for example, a rotation shaft of the motor.

The gear 502 receives a rotational force of the rotation shaft 504 to rotate. The gear 502 rotates by rotation of the rotation shaft 504. The gear 502 is attached to, for example, the rotation shaft 504.

The gear 502 meshes with the gear 503. The gear 502 drives the gear 503. The gear 502 transmits a rotational force to the gear 503. The gear 502 causes the gear 503 to rotate.

The gear 503 rotates about the rotation shaft $A_{30}$. An axis of the gear 503 is the rotation axis $A_{30}$. Rotation of the gear 503 causes the wedge prism 30 to rotate.

The gear 503 is formed on, for example, an outer periphery of the wedge prism 30. The gear 503 is formed on, for example, an outer peripheral portion of the wedge prism 30. The gear 503 is formed on, for example, a member holding the wedge prism 30. The member holding the wedge prism 30 is, for example, a barrel, a prism frame or the like. The gear 503 is formed on, for example, the barrel holding the wedge prism 30.

The rotation mechanism 60 causes the wedge prism 40 to rotate. The rotation mechanism 60 includes a driving source 601, a gear 602, the gear 603, and a rotation shaft 604.

The driving source 601 is, for example, a motor. The driving source 601 is, for example, a stepping motor or the like. The rotation shaft 604 is a shaft for transmitting rotation of the driving source 601 to the gear 602. The rotation shaft 604 is, for example, a rotation shaft of the motor.

The gear 602 receives a rotational force of the rotation shaft 604 to rotate. The gear 602 rotates by rotation of the rotation shaft 604. The gear 602 is attached to, for example, the rotation shaft 604.

The gear 602 meshes with the gear 603. The gear 602 drives the gear 603. The gear 602 transmits a rotational force to the gear 603. The gear 602 causes the gear 603 to rotate.

The gear 603 rotates about the rotation axis $A_{40}$. An axis of the gear 603 is the rotation axis $A_{40}$. Rotation of the gear 603 causes the wedge prism 40 to rotate.

The gear 603 is formed on, for example, an outer periphery of the wedge prism 40. The gear 603 is formed on, for example, an outer peripheral portion of the wedge prism 40. The gear 603 is formed on, for example, a member holding the wedge prism 40. The member holding the wedge prism 40 is, for example, a barrel, a prism frame or the like. The gear 603 is formed on, for example, a barrel holding the wedge prism 40.

(Control Circuit 70)

The control circuit 70 controls, for example, rotation amount or rotation speed of the rotation mechanism 50. The control circuit 70 controls, for example, rotation amount or rotation speed of the rotation mechanism 60. The rotation mechanism 60 and the control circuit 70 may be controlled by different control circuits.

[Aberration Correction by Light Irradiation Device 100]

The incident surface 301 has the aberration correction surface 910. The incident surface 301 is, for example, the aberration correction surface 910. Aberrations corrected by the incident surface 301 are, for example, commonly known five Seidel aberrations. Specifically, aberrations corrected by the incident surface 301 are spherical aberration, coma aberration, field curvature aberration, astigmatism aberration, and distortion aberration.

The incident surface 301 is effective for correcting these aberrations. The incident surface 301 reduces blurring of the contour of an image irradiated onto the irradiation surface. The incident surface 301 corrects blurring of the contour of an image on the irradiation surface. With the incident surface 301, an image whose shape deformation is reduced is projected.

An image projected by the light irradiation device 100 includes a light distribution pattern. An image projected by the projection optical system 20 includes a light distribution pattern. The light distribution pattern includes the shape of light distribution and light distribution. The light distribution indicates how intensely light is emitted in each direction (angle) from a light source. The light distribution is a change or a distribution of luminous intensity of the light source or an illumination device with respect to an angle.

The incident surface 301 corrects deformation of a light distribution pattern projected on the irradiation surface. The light distribution pattern is formed based on light emitted from the light source 10. The light distribution pattern is formed based on, for example, a light source image. The image projected by the projection optical system 20 is, for example, an image of the light source 10. The image projected by the projection optical system 20 is, for example, a light distribution pattern.

The incident surface 301 of the wedge prism 30 has a positive refractive power. The aberration correction surface 910 formed at the incident surface 301 of the wedge prism 30 has a positive refractive power. The projection optical system 20 has a positive refractive power. The refractive power of the incident surface 301 of the wedge prism 30 is smaller than the refractive power of the projection optical system 20, for example.

It is conceivable to form the aberration correction surface 910 at the incident surface 201 or the emission surface 202 of the projection optical system 20. However, the diameter of a light beam passing through the projection optical system 20 is smaller than the diameter of the light beam incident on the wedge prism 30. This is because the light-emitting surface 101 of the light source 10 has an area.

As above, the light source 10 is described as, for example, an LED. That is, light emitted from the center of the light-emitting surface 101 of the light source 10 is light parallel to the optical axis $C_{20}$ of the projection optical system 20. In contrast, light emitted from a peripheral portion of the light-emitting surface 101 of the light source 10 is tilted relative to the optical axis $C_{20}$. Thus, light emitted from the projection optical system 20 is not completely parallel to the optical axis $C_{20}$. Light emitted from the projection optical system 20 is expanded light. The "light changed to parallel light" includes light tilted relative to an optical axis of an optical system for converting light to parallel light. In this example, the optical system for converting light to parallel light is the projection optical system 20.

Thus, the diameter of the light beam passing through the projection optical system 20 is smaller than the diameter of the light beam incident on the wedge prism 30. The greatest advantage is obtained when aberration correction is performed at a position where the beam diameter is the largest. For this reason, it is advantageous that the incident surface 201 or the emission surface 202 of the projection optical system is not the aberration correction surface 910 but the incident surface 301 of the wedge prism 30 is the aberration correction surface 910.

The emission surface 302 of the wedge prism 30 reflects light passing through the emission surface 302, in one direction. That is, the emission surface 302 deflects light passing through the emission surface 302, in one direction. Accordingly, light passing through the emission surface 302 of the wedge prism 30 does not show an isotropic distribution with respect to the optical axis $C_{20}$ of the projection optical system 20.

Thus, even if aberration correction is performed for light passing through the emission surface 302 of the wedge prism 30, the effect of aberration correction is reduced. It is more advantageous for aberration correction to form the aberration correction surface 910 at the incident surface 301 of the wedge prism 30 than to form the aberration correction surface 910 at any one of the emission surface 302, the incident surface 401, and the emission surface 402.

Figure 2:
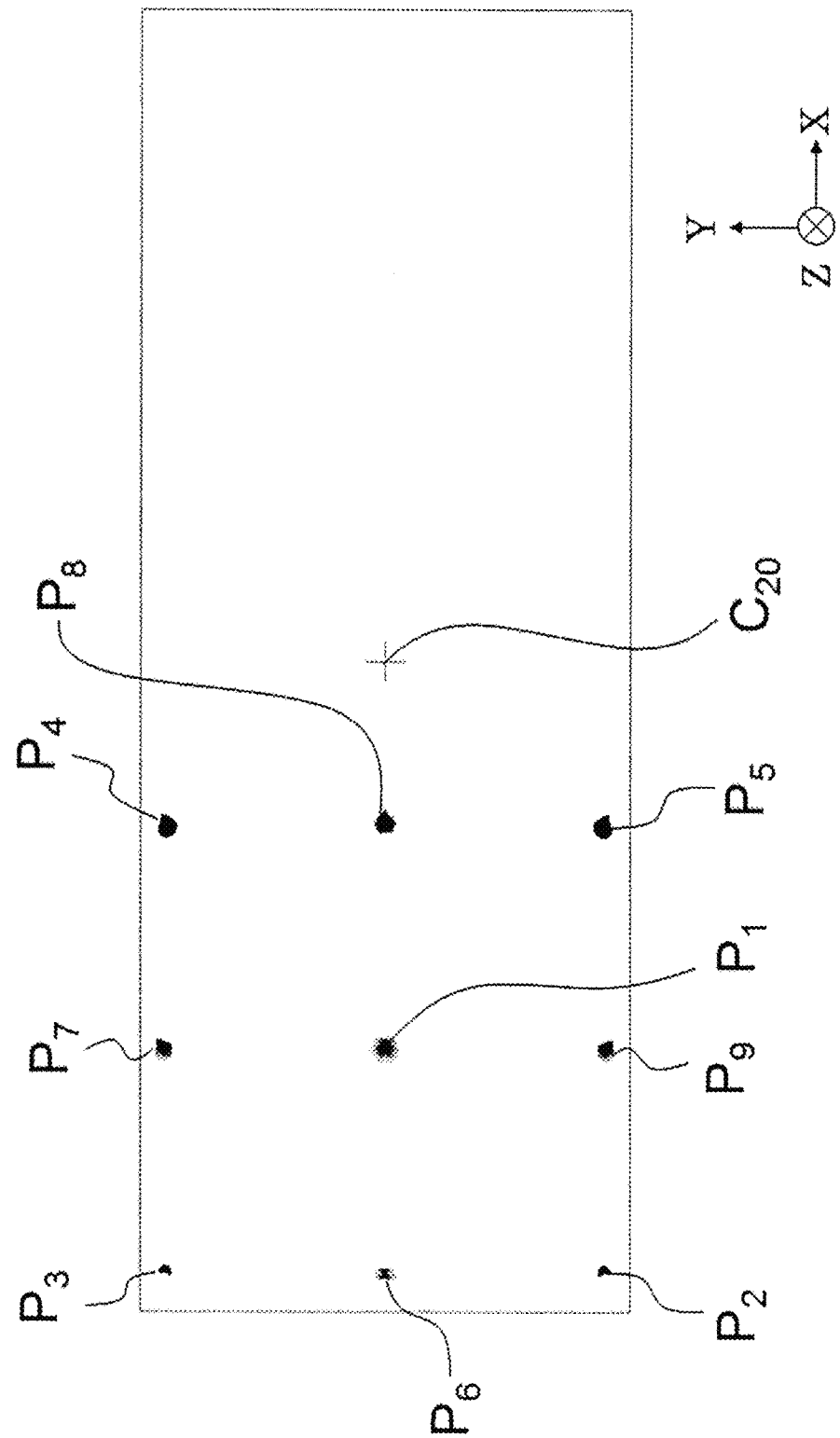
FIG. 2 is a view illustrating a spot diagram of the light irradiation device 100 according to the first embodiment of the present invention.

FIG. 2 is a view illustrating light-collecting spots in a case where light-emitting points $S_n$ on the light-emitting surface 101 are projected. FIG. 2 shows light-collecting spots in a case where emitted light is deflected in the −X-axis direction by the light irradiation device 100. FIG. 2 is a view showing a spot diagram. The "spot diagram" is a diagram obtained by tracking a number of light rays from the light source to an image plane and plotting locations on the image plane where the light rays reach. The spot diagram is suitable for visually recognizing the degree of light collection or a geometric behavior of aberration.

The two wedge prisms 30 and 40 are rotated by 45 degrees in opposite directions with respect to a reference position. The reference position for the wedge prisms 30 and 40 is a position at which the emission surface 302 is parallel to a tilt surface of the wedge prism 40.

In FIG. 1, the tilt surface of the wedge prism 40 is the incident surface 401. That is, in FIG. 1, the reference position is a position in which the emission surface 302 and the incident surface 401 are parallel to each other. FIG. 1 shows a state where the wedge prisms 30 and 40 are in the reference position. In the reference position illustrated in FIG. 1, a thinnest portion of the wedge prism 30 is located on the +Y-axis direction side. A thinnest portion of the wedge prism 40 is located on the −Y-axis direction side.

Figure 3:
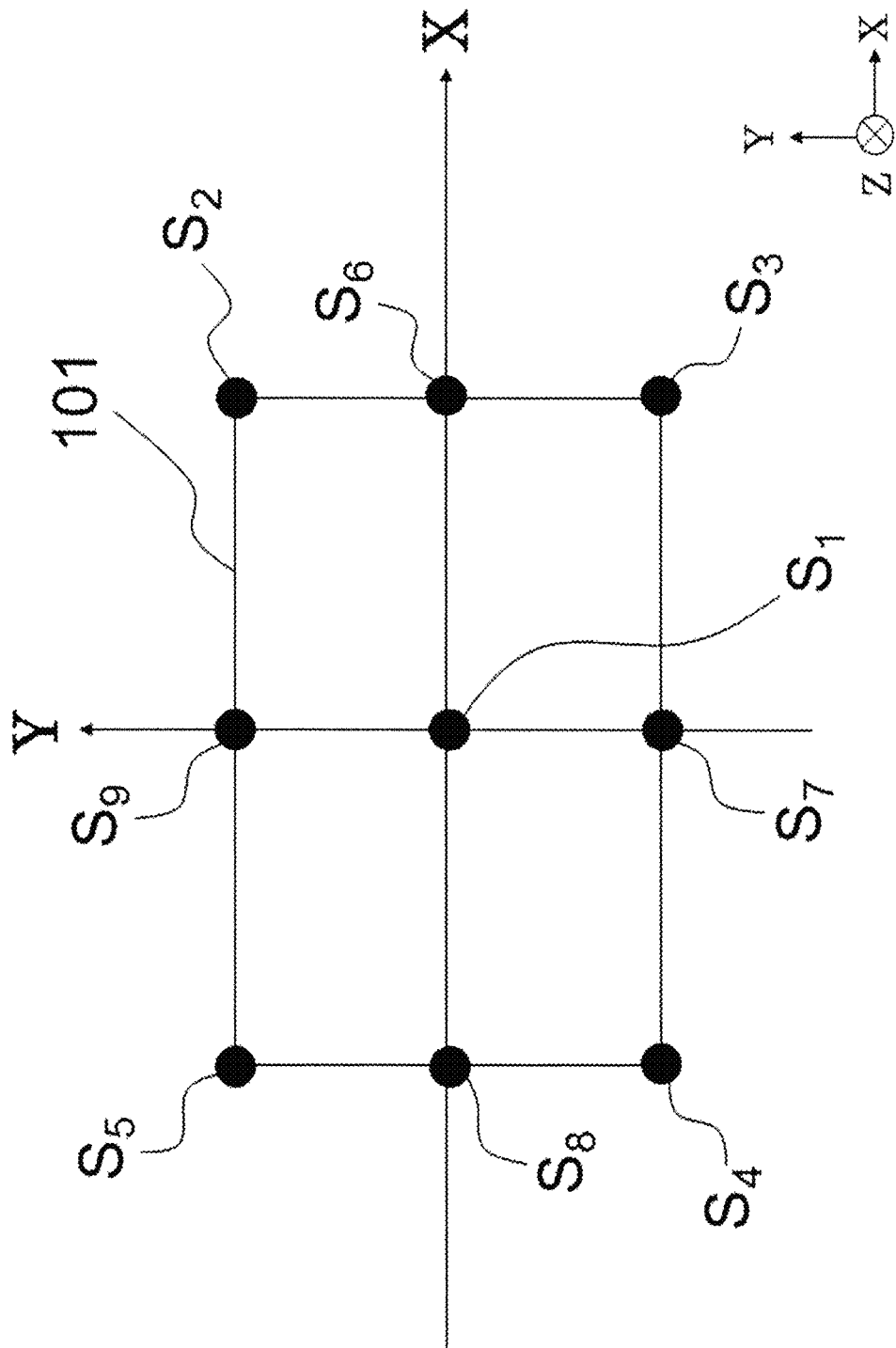
FIG. 3 is a diagram showing evaluation points on a light-emitting surface 101 according to the first embodiment of the present invention.

FIG. 3 is a view illustrating light-emitting points $S_n$ on the light-emitting surface 101. Light-collecting spots $P_n$ illustrated in FIG. 2 are light-collecting spots on the irradiation surface formed by light emitted from light-emitting points $S_n$ on the light-emitting surface 101 illustrated in FIG. 3. The light-emitting point $S_1$ is located at the center of the light-emitting surface 101. The light-emitting point $S_1$ is located on the optical axis $C_{10}$ of the light source 10, for example. The light-emitting points $S_2$, $S_3$, $S_4$, and $S_5$ are located at four corners of the light-emitting surface 101. The light-emitting points $S_6$, $S_7$, $S_8$, and $S_9$ are located at respective intermediate points of the four sides of the light-emitting surface 101. FIG. 3 is a view as seen from the backside (from the −Z-axis direction) of the light-emitting surface 101.

When n represents an integer from 1 to 9, the light-collecting spots $P_n$ illustrated in FIG. 2 are light-collecting spots of light emitted from the light-emitting points $S_n$ illustrated in FIG. 3. Light emitted from the point $S_n$ is collected at a position opposite to the point $S_n$ in the X-axis direction with respect to the optical axis $C_{20}$ of the projection optical system 20. Light emitted from the point $S_n$ is collected at a position opposite to the point $S_n$ in the Y-axis direction with respect to the optical axis $C_{20}$. The optical axis $C_{10}$ of the light source 10 and the optical axis $C_{20}$ of the projection optical system 20 are the same axis.

[Comparative Example]

Figure 4:
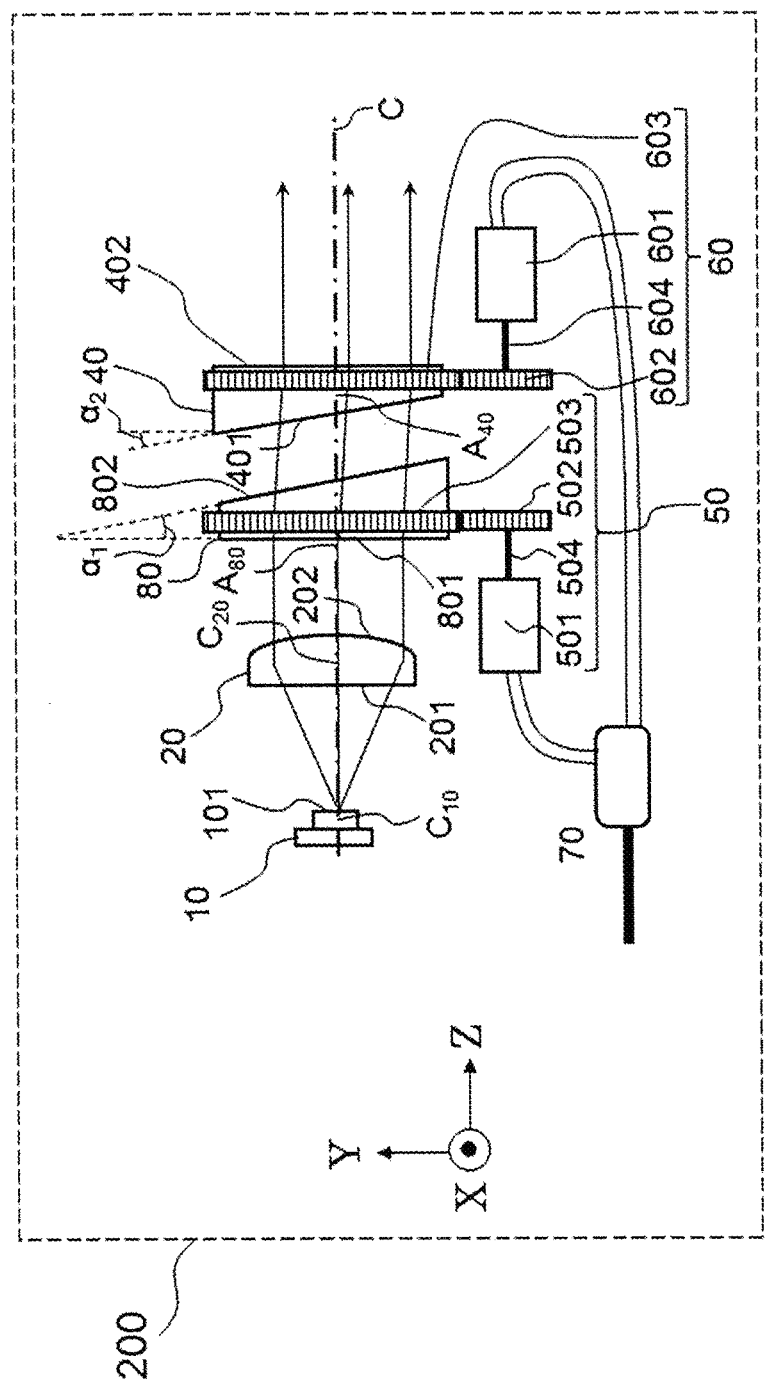
FIG. 4 is a view schematically illustrating a configuration of a light irradiation device 200 according to a comparative example.

FIG. 4 is a view schematically illustrating a configuration of a light irradiation device 200. The light irradiation device 200 illustrated in FIG. 4 is a comparative example. The light irradiation device 200 is different from the light irradiation device 100 in that the light irradiation device 200 uses a wedge prism 80 instead of the wedge prism 30. Except for the use of the wedge prism 80, the light irradiation device 200 is similar to the light irradiation device 100. Components which are similar to those of the light irradiation device 100 are denoted by the same reference characters, and description thereof will be omitted.

The wedge prism 80 is held to rotate about a rotation axis $A_{80}$.

An incident surface 801 of the wedge prism 80 is a flat surface. The incident surface 801 is a surface perpendicular to the rotation axis $A_{80}$. That is, the light irradiation device 200 does not has a surface for correcting an aberration. The light irradiation device 200 does not have the aberration correction surface 910.

Figure 5:
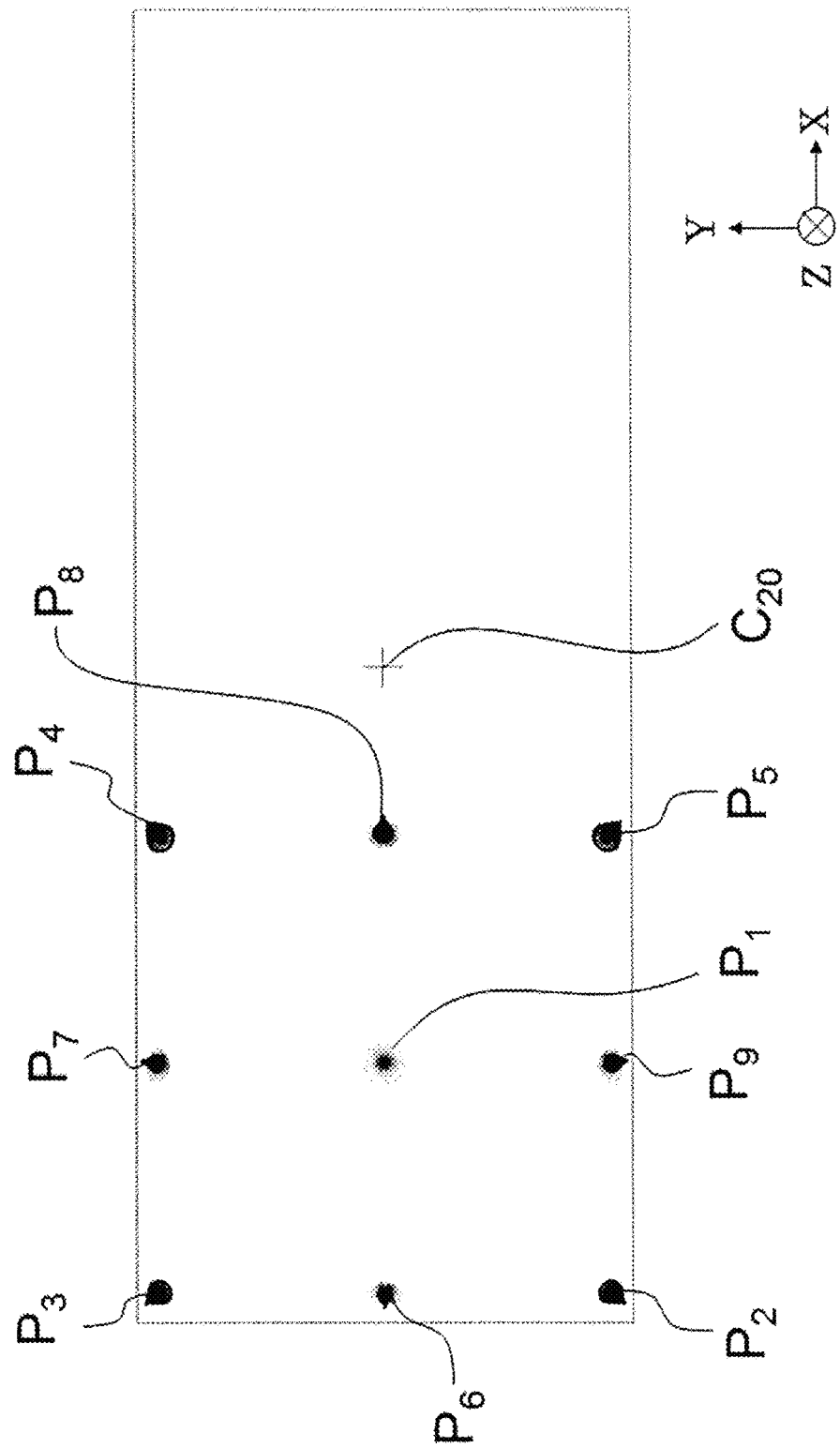
FIG. 5 is a view illustrating a spot diagram of the light irradiation device 200 according to the comparative example.

FIG. 5 is a view illustrating a spot diagram of the light irradiation device 200. FIG. 5 shows light-collecting spots in a case where emitted light is deflected in the −X-axis direction by the light irradiation device 200. The two wedge prisms 80 and 40 are rotated by 45 degrees in opposite directions with respect to a reference position.

The diameters of light-collecting spots of the light irradiation device 200 are larger than the diameters of light-collecting spots of the light irradiation device 100. That is, large aberrations occur on an irradiation surface in the light irradiation device 200. Thus, the contour of irradiation light is blurred.

That is, by forming the aberration correction surface 910 at the incident surface 301 of the wedge prism 30, occurrence of aberrations on the irradiation surface can be reduced. That is, blurring of the contour of irradiation light is reduced.

[Modification]

Figure 6:
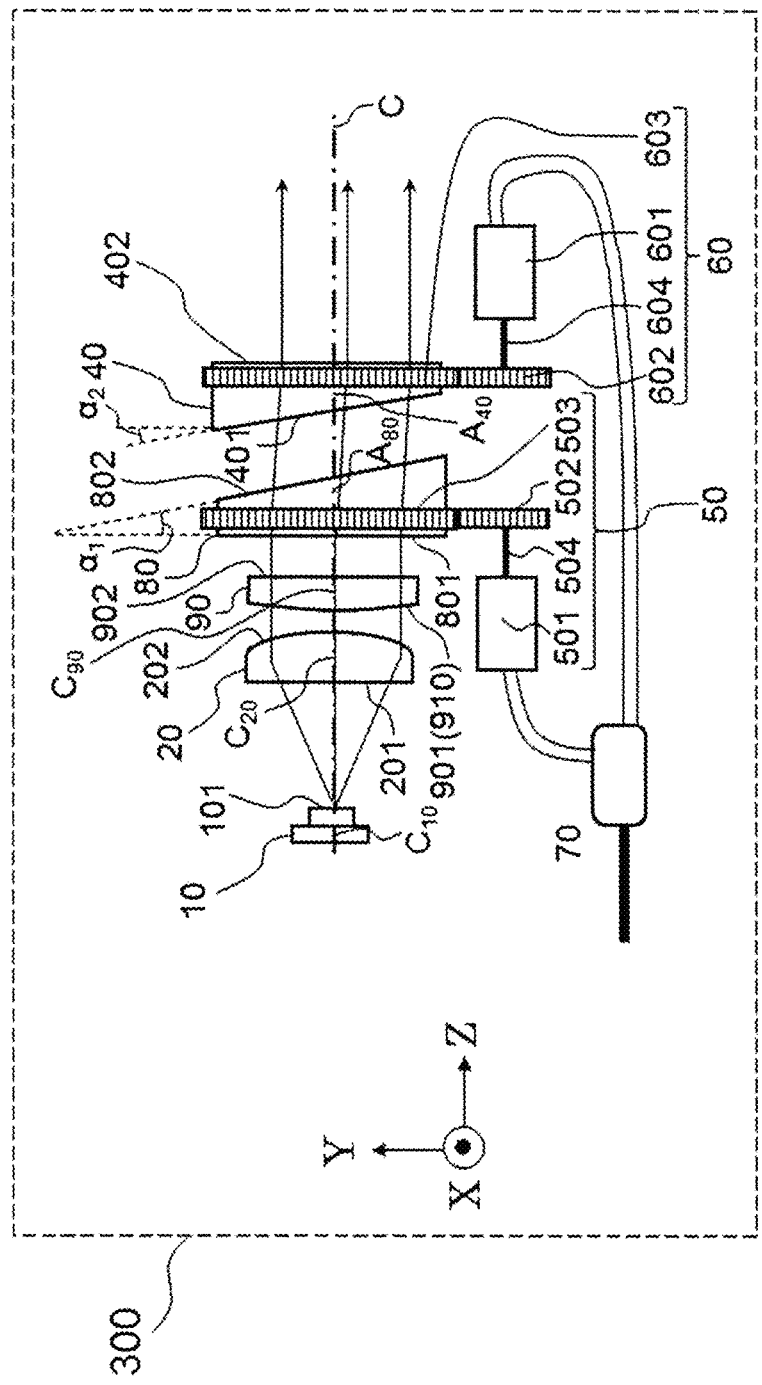
FIG. 6 is a view illustrating a configuration of a light irradiation device 300 according to a modification of the present invention.

FIG. 6 is a view illustrating a configuration of a light irradiation device 300 according to a modification.

The light irradiation device 300 is different from the light irradiation device 100 in that the light irradiation device 300 includes a wedge prism 80 instead of the wedge prism 30 and includes an aberration correcting optical system 90. The light irradiation device 300 is different from the light irradiation device 200 in that the light irradiation device 300 includes the aberration correcting optical system 90. The other structures of the light irradiation device 300 are similar to those of the light irradiation devices 100 and 200. Components which are similar to those of the light irradiation devices 100 and 200 are denoted by the same reference characters, and description thereof will be omitted.

The aberration correcting optical system 90 is disposed between the projection optical system 20 and the wedge prism 80. The aberration correcting optical system 90 includes the aberration correction surface 910. The aberration correction surface 910 is formed in the aberration correcting optical system 90. The aberration correcting optical system 90 includes the aberration correction surface 910.

The aberration correcting optical system 90 is, for example, a lens. The aberration correcting optical system 90 may be, for example, one lens. Alternatively, the aberration correcting optical system 90 may include, for example, a plurality of lenses.

In FIG. 6, the aberration correction surface 910 is formed at, for example, an incident surface 901 of the aberration correcting optical system 90. For example, the aberration correction surface 910 is included in the incident surface 901 of the aberration correcting optical system 90. Alternatively, the aberration correction surface 910 may be formed at the emission surface 902 of the aberration correcting optical system 90. The aberration correction surface 910 may be included in the emission surface 902 of the aberration correcting optical system 90. The aberration correction surface 910 may be formed at a plurality of surfaces of the aberration correcting optical system 90. The aberration correction surface 910 may be included in a plurality of surfaces of the aberration correcting optical system 90.

An optical axis $C_{90}$ is an optical axis of the aberration correcting optical system 90. The optical axis $C_{90}$ and the optical axis $C_{20}$ are, for example, the same axis. The optical axis $C_{10}$, the optical axis $C_{20}$, the optical axis $C_{90}$, the rotation axis $A_{80}$, and the rotation axis $A_{40}$ are, for example, the same axis.

The aberration correction surface 910 of the light irradiation device 100 is provided on the incident surface 301 of the wedge prism 30. The aberration correction surface 910 of the light irradiation device 300 is located on the wedge prism 30 side with respect to the emission surface 202 of the projection optical system 20. That is, the aberration correction surface 910 is located on the wedge prism 30 side with respect to the emission surface 202 of the projection optical system 20. With respect to the wedge prism 30, the aberration correction surface 910 is located on the projection optical system 20 side including the incident surface 301 of the wedge prism 30.

In the foregoing embodiment, terms such as "parallel", "perpendicular" indicating positional relationships among components, and terms indicating the shapes of the components are used. These terms include a range in which manufacturing tolerance and assembly variation are taken into consideration.

Although the embodiment of the present invention has been described, the invention is not limited to the embodiment.

DESCRIPTION OF REFERENCE CHARACTERS 100, 200, 300 light irradiation device; 10 light source; 101 light-emitting surface; 20 projection optical system; 30, 40, 80 wedge prism; 301, 401, 801 incident surface; 302, 402, 802 emission surface; 50, 60 rotation mechanism; 501, 601 driving source; 502, 503, 602, 603 gear; 504, 604 rotation shaft; 70 control circuit; 90 aberration correcting optical system; 901 incident surface; 902 emission surface; 910 aberration correction surface; $A_{30}$, $A_{40}$, $A_{80}$ rotation axis; C, $C_{10}$, $C_{20}$, $C_{30}$, $C_{90}$ optical axis; $P_1$, $P_2$, $P_3$, $P_4$, $P_5$, $P_6$, $P_7$, $P_8$, $P_9$ light-collecting spot; $S_1$, $S_2$, $S_3$, $S_4$, $S_5$, $S_6$, $S_7$, $S_8$, $S_9$ light-emitting point; $\alpha$, $\alpha_1$, $\alpha_2$ wedge angle.

What is claimed is:

1. A light irradiation device comprising:
a light source to emit light;
a projection optical system to project an image formed based on the light emitted from the light source;
an aberration correction surface to correct an aberration occurring when the image is projected by the projection optical system;
a first wedge prism to receive and deflect the light emitted from the projection optical system; and
a second wedge prism to receive and deflect the light deflected by the first wedge prism,
wherein the first wedge prism and the second wedge prism are held so that a deflection direction of light emitted from the second wedge prism is changeable by rotation of at least one of the first wedge prism and the second wedge prism, and wherein the aberration correction surface is at an incident surface of the first wedge prism.

2. The light irradiation device according to claim 1, wherein in a case where the first wedge prism is held to rotate, a first rotation axis of the first wedge prism passes through the incident surface and an emission surface of the first wedge prism.

3. The light irradiation device according to claim 2, wherein the aberration correction surface is a surface formed at the incident surface of the first wedge prism and is rotationally symmetric with respect to the first rotation axis.

4. The light irradiation device according to claim 2, wherein the first rotation axis and an optical axis of the projection optical system are the same axis.

5. The light irradiation device according to claim 2, wherein a second rotation axis about which the second wedge prism is rotatable passes through the incident surface of the second wedge prism and an emission surface of the second wedge prism.

6. The light irradiation device according to claim 1, wherein the aberration correction surface has a convex surface shape.

7. The light irradiation device according to claim 1, wherein the light source includes a planar light-emitting surface.

8. The light irradiation device according to claim 1, wherein the image is a planar image.

9. The light irradiation device according to claim 1, wherein in a case where the second wedge prism is held to rotate, a second rotation axis of the second wedge prism passes through an incident surface and an emission surface of the second wedge prism.

10. The light irradiation device according to claim 1, wherein the aberration correction surface receives the image directly from the projection optical system.

11. The light irradiation device according to claim 1, wherein the emission surface of the first wedge prism is spaced apart from the incident surface of the second wedge prism.

12. The light irradiation device according to claim 1,
wherein an emission surface of the first wedge prism is tilted relative to a surface perpendicular to a first rotation axis about which the first wedge prism is rotatable,
wherein an incident surface of the second wedge prism is tilted relative to a surface perpendicular to a second rotation axis about which the second wedge prism is rotatable, and
wherein the emission surface of the first wedge prism and the incident surface of the second wedge prism, both of which are tilted, face each other.

13. The light irradiation device according to claim 1, wherein the first wedge prism and the second wedge prism are held so that a deflection direction of light emitted from the second wedge prism is changeable by rotation of the first wedge prism and the second wedge prism.

14. The light irradiation device according to claim 1,
wherein the first wedge prism is rotatable about a first rotation axis,
wherein the second wedge prism is rotatable about a second rotation axis, and
wherein the first wedge prism and the second wedge prism are rotatable about the first rotation axis and the second rotation axis, respectively, relative to each other and independent of each other.

* * * * *